Figure 1:
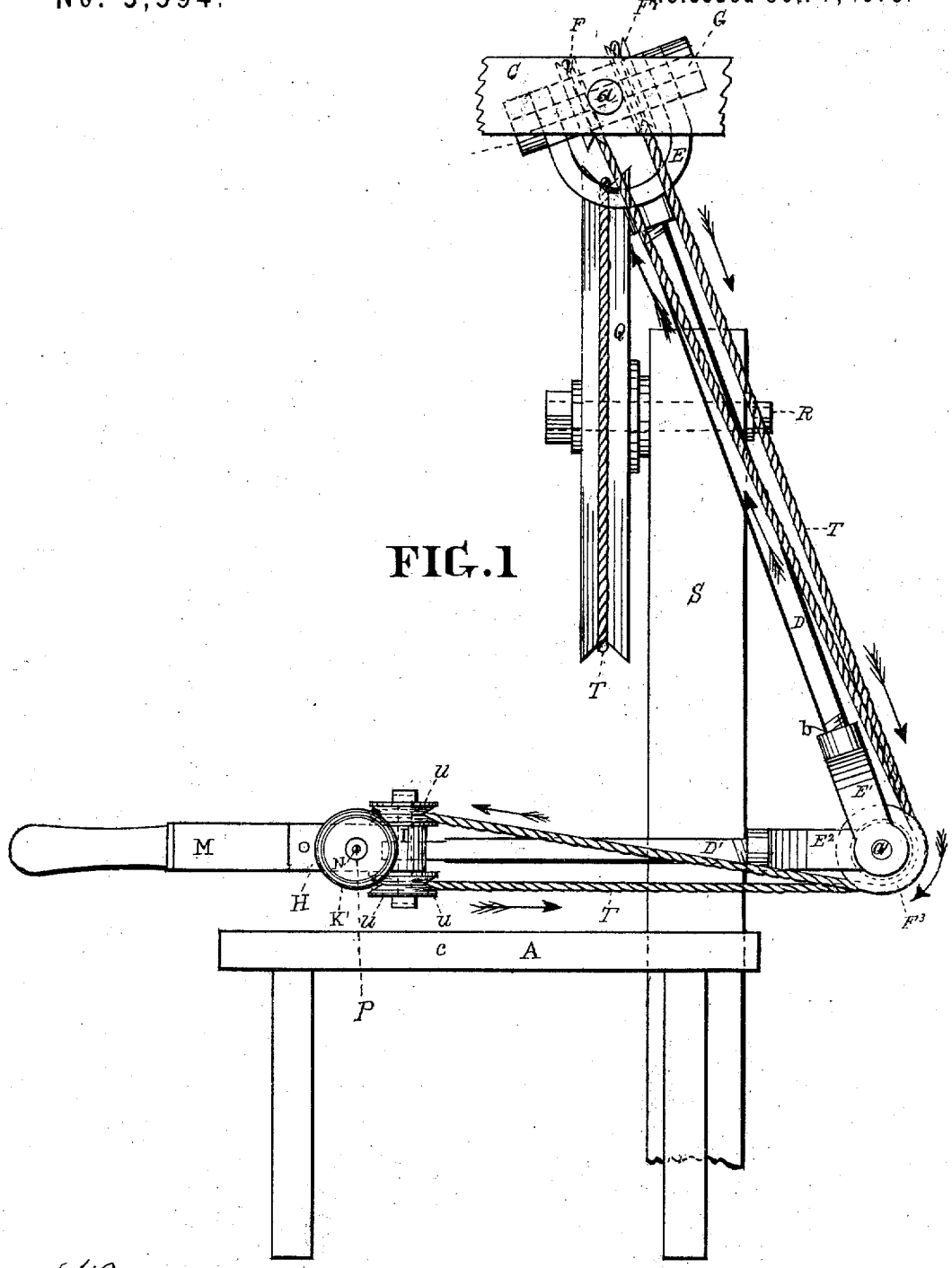

2 Sheets--Sheet 1.

B. J. TAYMAN.
Carving-Machines.

No. 5,594. Reissued Oct. 7, 1873.

Witnesses
Thomas J. Bewley
Stephen Ustick

Inventor
Benjamin J. Tayman

AM. PHOTO-LITHOGRAPHIC Co. N.Y. (OSBORNE'S PROCESS)

B. J. TAYMAN.
Carving-Machines.
No. 5,594. Reissued Oct. 7, 1873.
FIG. 4
FIG. 3
FIG. 5
FIG. 2
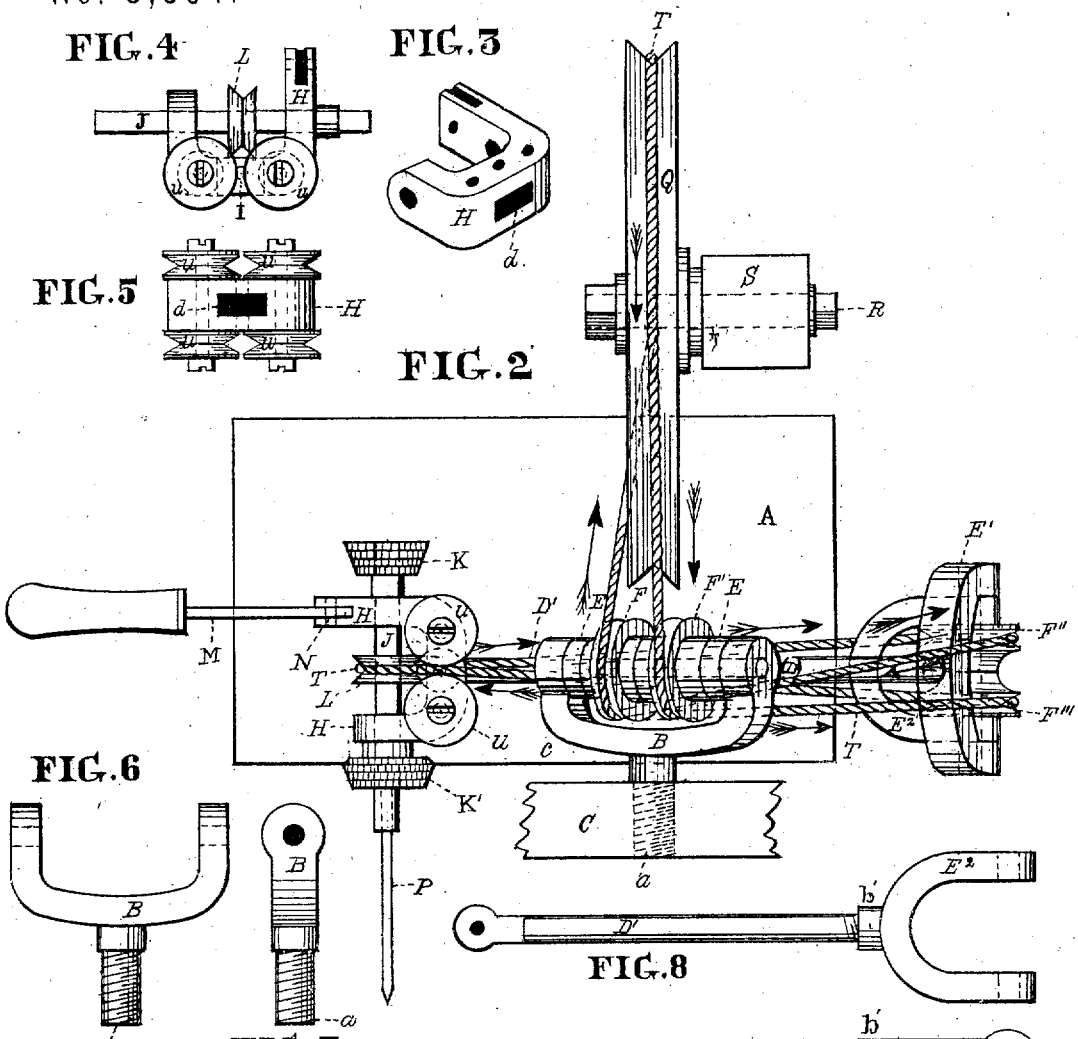
FIG. 6
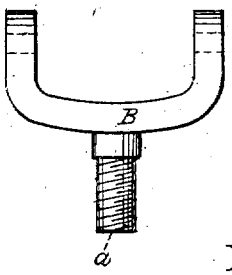
FIG. 7
FIG. 8
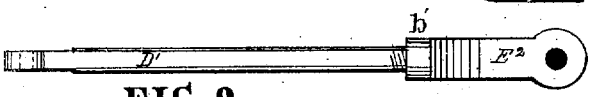
FIG. 9
FIG. 10
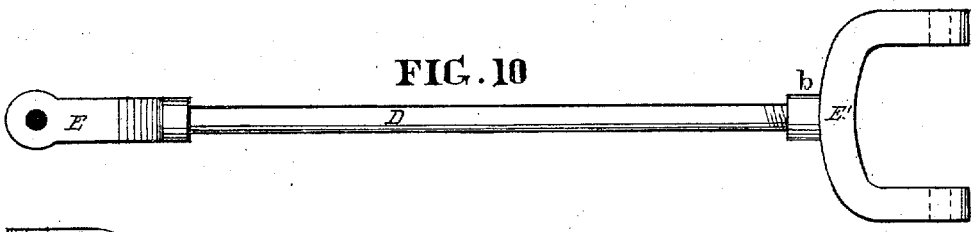
FIG. 11
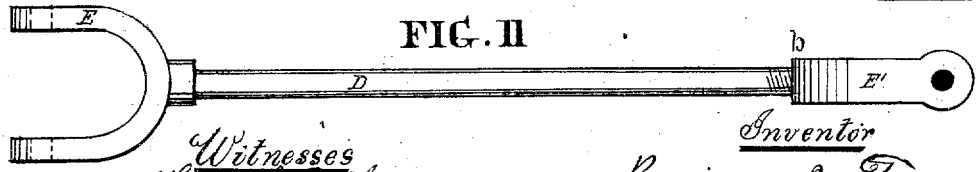
Witnesses
Thomas B. Bewley
Stephen Uslick
Inventor
Benjamin J. Tayman
A.M. PHOTO-LITHOGRAPHIC Co. N.Y. (OSBORNE'S PROCESS)

UNITED STATES PATENT OFFICE.

BENJAMIN J. TAYMAN, OF PHILADELPHIA, PENNSYLVANIA.

IMPROVEMENT IN CARVING-MACHINES.

Specification forming part of Letters Patent No. 126,994, dated May 21, 1872; antedated May 8, 1872; reissue No. 5,594, dated October 7, 1873; application filed August 4, 1873.

*To all whom it may concern:*

Be it known that I, BENJAMIN J. TAYMAN, of the city of Philadelphia and State of Pennsylvania, have invented a Universal Traverser for Circular Cutters, &c., of which the following is a specification:

My invention relates to a combination of a cutter-stock with a series of jointed rods, sockets, yokes, and other devices, whereby flexible movements are given analogous to the shoulder, elbow, and wrist movements of the human arm, so as to present the cutter-stock in the required positions adapted to the various positions to be assumed by the cutters, as hereinafter described.

Figure 1 is a side elevation of the machine. Fig. 2, Sheet No. 2, is a plan view of the same. Fig. 3 is an isometrical view of the cutter-stock H. Figs. 4 and 5 are a plan and edge view of the same, provided with the mandrel J, having a pulley, L, and also the sheaves *u u u u*. Figs. 6 and 7 are views, at right angles to each other, of the yoke B. Figs. 8 and 9 are like views of the rod D′ and yoke $E^2$. Figs. 10 and 11 are like views of the rod D and yokes E and $E^1$.

Like letters in all the figures indicate the same parts of the machine.

A is a table for the support of the work. B is a yoke, shown in detail in Figs. 6 and 7. It is connected with the piece C of a standing frame or timber of the building, by means of the screw-stem *a*, which has an easy fit, to admit of a partial turning around of the yoke in either direction, as hereinafter described. D is a vertical rod, which is provided at its upper end with the yoke E, and at its lower end with the yoke $E^1$, shown in detail in Figs. 10 and 11. The lower end of the rod has a screw-thread, as represented, which has an easy fit in a female screw of the socket *b* of the yoke $E^1$, so as to admit of the easy twisting around of the yoke upon the rod, or of the rod in the yoke, in accommodation to the positions the cutter-head, hereinafter described, has to assume. The yokes B and E are connected together by means of the joint-pin G, upon which the yoke E partially turns, as the lower end of the rod D carrying the yoke $E^1$ is moved toward or from the side *c* of the table A. The joint-pin G is provided with sheaves F and $F^1$ for carrying the driving-band, hereinafter described. D′ is a horizontal rod, having at one end the yoke $E^2$, seen in detail in Figs. 8 and 9. The yoke has a flexible connection with the rod by the socket $b^1$, having an easy screw-connection therewith. The yokes $E^1$ and $E^2$ are connected together by means of the joint-pin G′, upon which they have a partial turn in either direction. The pin is provided with sheaves $F^2$ $F^3$ to receive the driving-band above mentioned. The other end of the rod D′ is connected with the cutter-stock H, shown in detail in Figs. 3, 4, and 5, by means of the mortise *d* of the cutter-stock and the joint-pin I, whereby the cutter-stock has a free lateral movement, by which, in connection with the twist movement of the rod D′ in the socket *b′*, and the turning of the yoke $E^2$ on the pin G′, a complete wrist movement is given to the cutter-stock, to accommodate it to the various configurations of the work to be executed. The cutter-stock is represented as having cutters K and K′ for forming bevels, moldings, &c., and a bit, P, for boring, drilling, &c.; yet it will readily appear that other description of tools may take their place. The middle portion of the mandrel J is provided with a pulley, L, to receive the above-mentioned band. A handle, M, for guiding the cutter-stock to the work, is connected with it by means of the joint-pin N. Q is the driving-wheel of the machine, hung by means of the stud-shaft R to the timber S, which projects upward from a standing frame, or is connected with the timbers of the building. T is the band for revolving the mandrel J. It passes around the pulley L, passing under it to the sheave $F^2$ on the joint-pin G′, thence up to and over the sheave F on the joint-pin G, and thence under the driving-wheel Q, over it, and to the sheave $F^1$, thence downward and to the sheave $F^3$, and thence over the pulley L, the place of beginning, as illustrated by the arrows; and hence, by the rotation of the band-wheel Q the mandrel J is revolved to operate the cutters. In order to admit of the cutter-stock H turning in either direction on the joint-pin I without turning the band T out of line with the sheaves $F^2$ and $F^3$, there is a pair of sheaves, *u u*, on both the upper and lower sides of the cutter-stock, as seen clearly in Figs. 4 and 5. The band coming between each pair of sheaves is kept in its normal position during the lateral movements of the cutter-stock.

It will readily be seen that, by the joint connection of the yokes E and B with each other by means of the joint-pin G, and of the yoke B with the timber C by means of the screw-stem *a*, the lower end of the rod D may be moved freely to the right or left, and forward or backward, thus having two double motions at right angles to each other, and thus admitting of the cutter-stock H being placed at any point over the table A, wherever the work has to be executed; and that in any change thus produced, or in accommodation to the different heights of the articles to be operated upon, the elevation of the cutter-stock is maintained or varied, as may be required, by the free movement of the yoke $E^2$ on the joint-pin G′. The cutter-stock, turning freely on the joint-pin I, admits of its making a short turn either way without changing the position of the rod D′.

By the free movements of the parts above described and shown, great flexibility is given to admit of any twisting or other movements of the cutter-stock in accommodation to the work to be executed.

I claim as my invention—

1. The combination of the rods D and D′, yokes B, E, $E^1$, and $E^2$, and joint-pins G and G′, and wrist-joint *b′*, for giving a shoulder-and-elbow movement, substantially in the manner and for the purpose above described.

2. The combination of the cutter-stock H, rod D′, yoke $E^2$, joint-pin G′, and wrist-joint *b′*, substantially as set forth.

3. The combination of the sheaves *u*, *u*, *u*, and *u*, with the cutter-stock H, band T, and bar D′, having the movable wrist-joint *b′*, for holding and guiding the band, so as to keep it in line with the sheaves $E^1$ and $E^2$ during the lateral turning of the cutter-stock, substantially as specified.

BENJAMIN J. TAYMAN.

Witnesses:
STEPHEN USTICK,
THOMAS J. BEWLEY.